United States Patent [19]
Downer et al.

[11] Patent Number: 5,966,867
[45] Date of Patent: Oct. 19, 1999

[54] STAKE CROSS ARM FOR ORCHARDS AND GRAPEVINES

[75] Inventors: Paul A. Downer, Sebastopol; John S. Downer, Santa Rosa, both of Calif.

[73] Assignee: Vineyard Industry Products Co., Windsor, Calif.

[21] Appl. No.: 09/093,199

[22] Filed: Jun. 8, 1998

[51] Int. Cl.⁶ .................................................. A01G 17/04
[52] U.S. Cl. ................................................ 47/46; 47/47
[58] Field of Search ............................ 47/44, 46, 47; 256/60, 68

[56] References Cited

U.S. PATENT DOCUMENTS

| | | | |
|---|---|---|---|
| 3,791,070 | 2/1974 | Roberts | 47/46 |
| 3,807,089 | 4/1974 | Senese | 47/46 |
| 3,875,699 | 4/1975 | Lamarre | 47/46 |
| 4,329,811 | 5/1982 | Coulson | 47/46 |
| 4,336,667 | 6/1982 | Evans | 47/46 X |
| 4,536,989 | 8/1985 | Caywood et al. | 47/46 |
| 4,792,122 | 12/1988 | Smrt | 256/68 |
| 5,144,768 | 9/1992 | Hiyama et al. | 47/46 |
| 5,349,780 | 9/1994 | Dyke | 47/47 |
| 5,501,035 | 3/1996 | Downer et al. | 47/47 |

OTHER PUBLICATIONS

"Ranchguard, Agricultural Trellis Systems," Georgia–Pacific Corporation, Aug. 1989.
"Oregon Winegrape Growers' Guide", 94.

*Primary Examiner*—Robert P. Swiatek
*Attorney, Agent, or Firm*—Flehr Hohbach Test Albritton & Herbert

[57] ABSTRACT

A cross arm (110) for securing to a grape stake (135) for use in supporting grapevines or orchard trees, including raised ribs (112, 114), aligned indentations (116, 118) and a pattern of holes (122, 124, 126, 128, 130) for receiving the legs of a U-bolt that rigidly secures the cross arm to the stake with a side edge of the stake anchored firmly into indentations (116, 118).

10 Claims, 7 Drawing Sheets

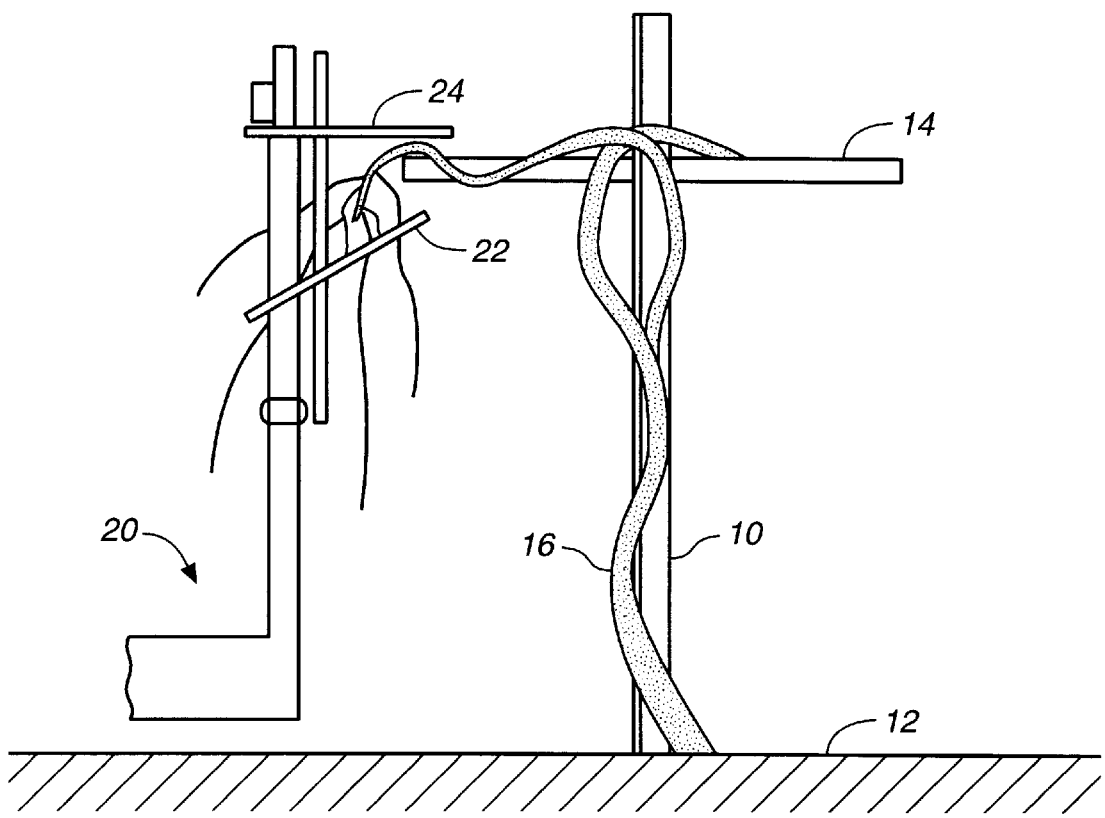
FIG._1
*(PRIOR ART)*

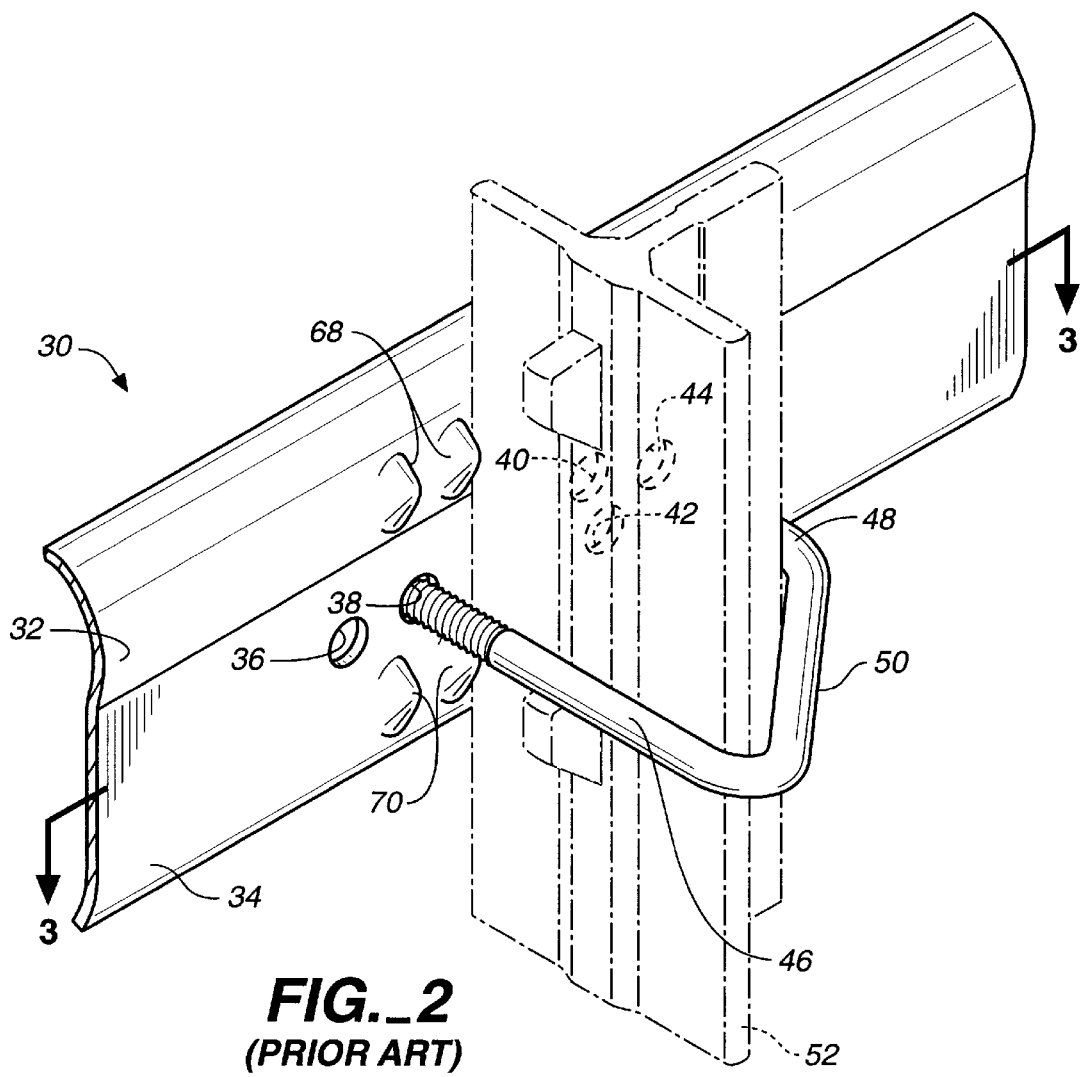
FIG._2
*(PRIOR ART)*
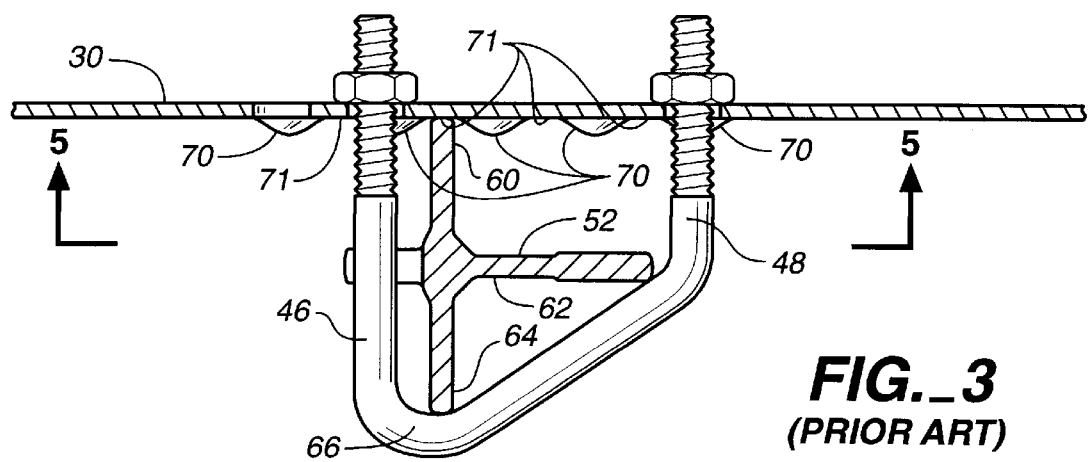
FIG._3
*(PRIOR ART)*

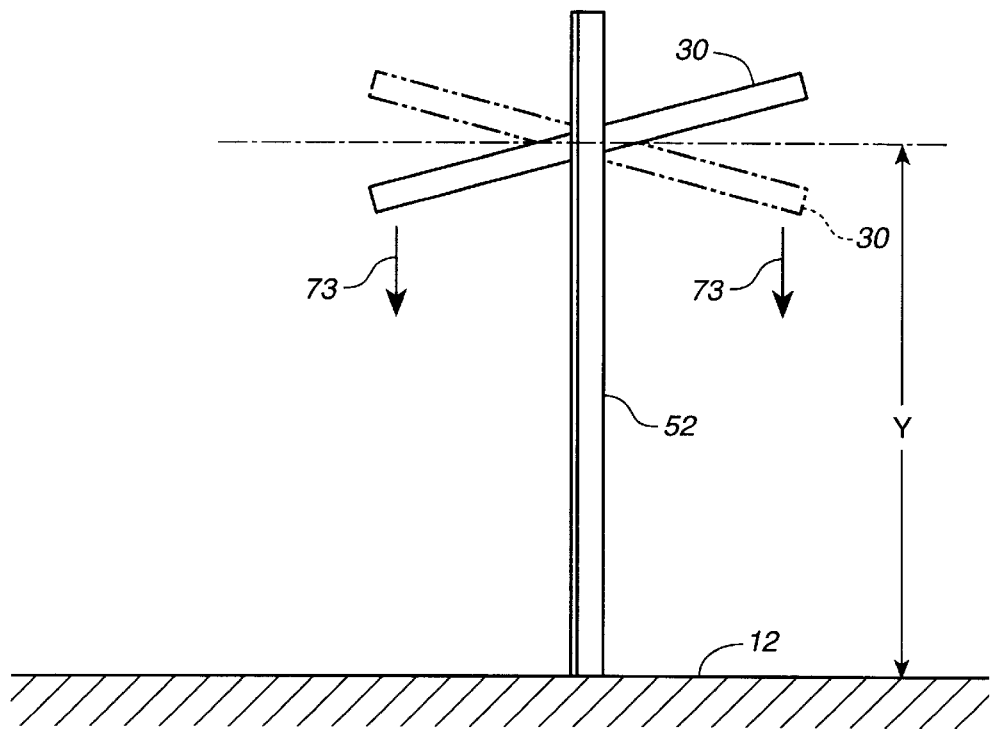
FIG._4
*(PRIOR ART)*
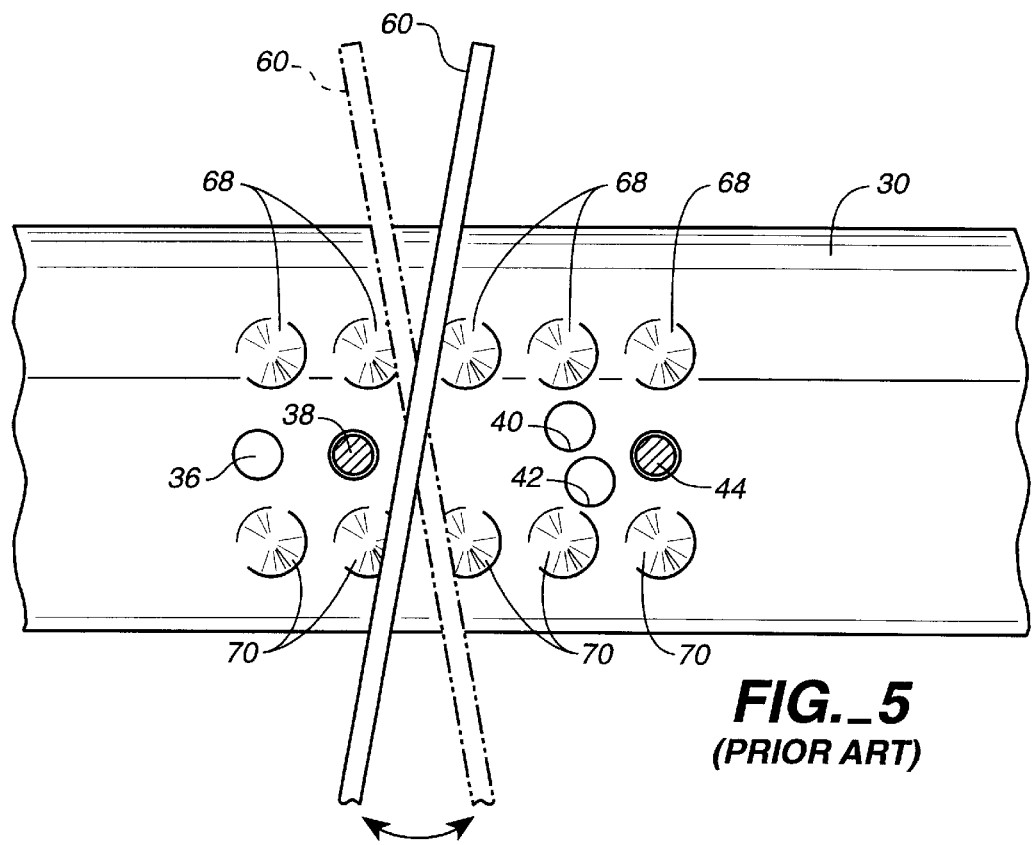
FIG._5
*(PRIOR ART)*

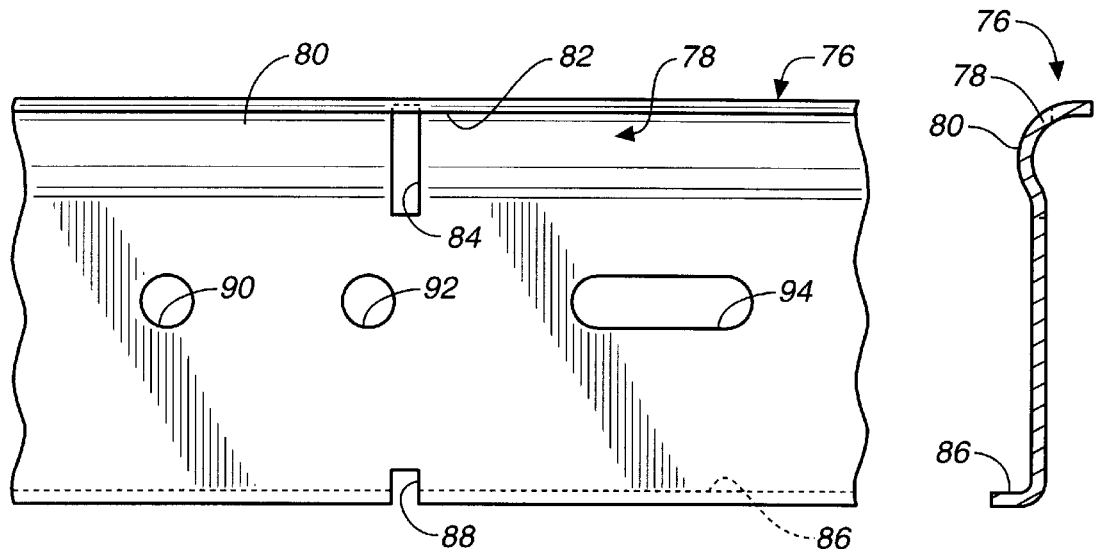
FIG._6   FIG._7
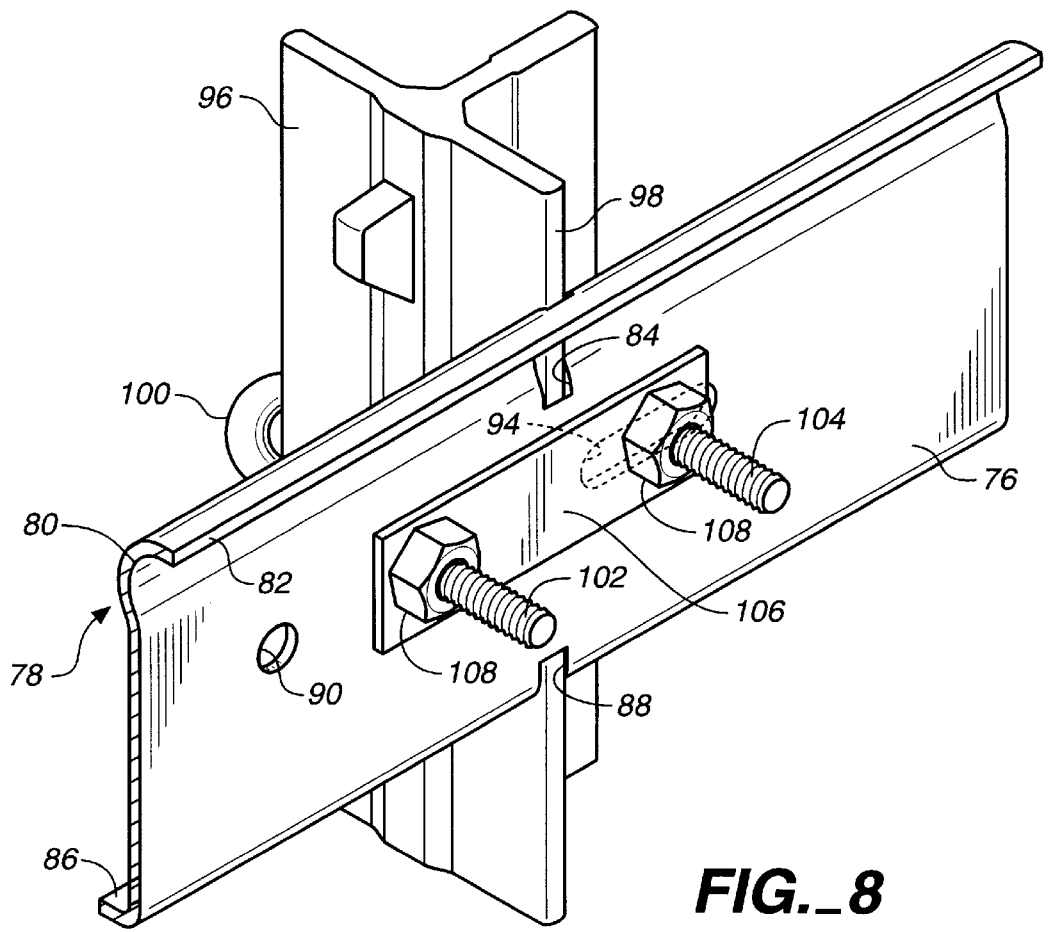
FIG._8

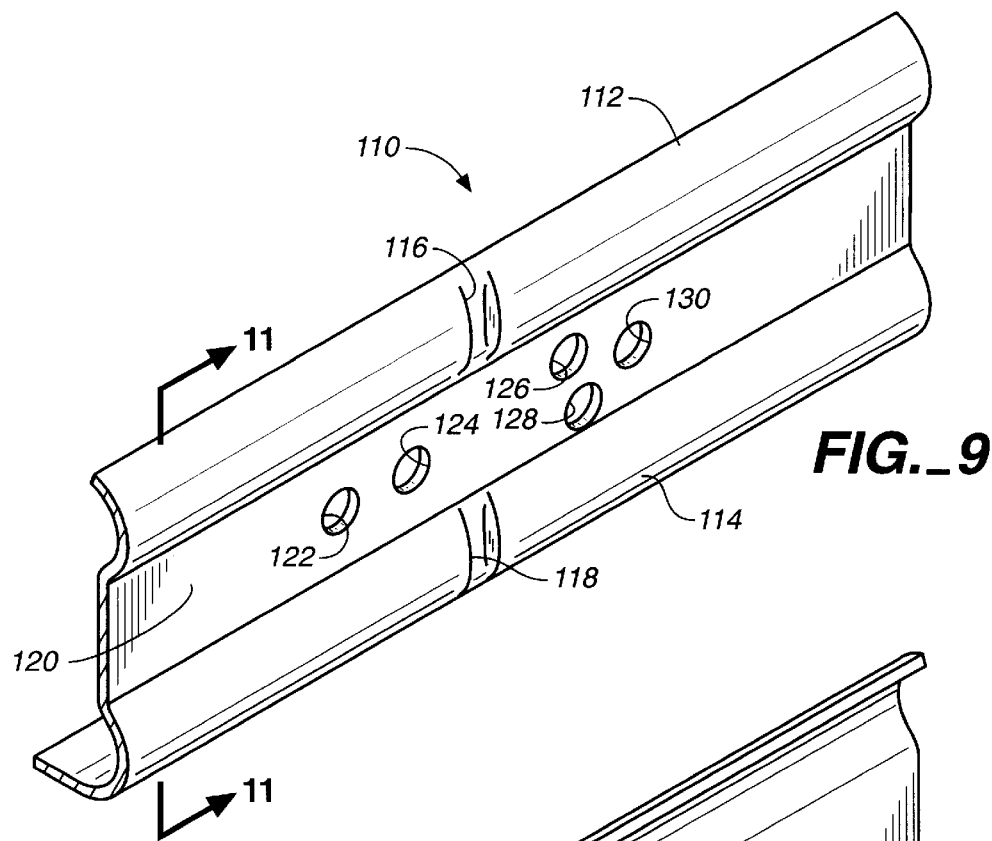
FIG._9
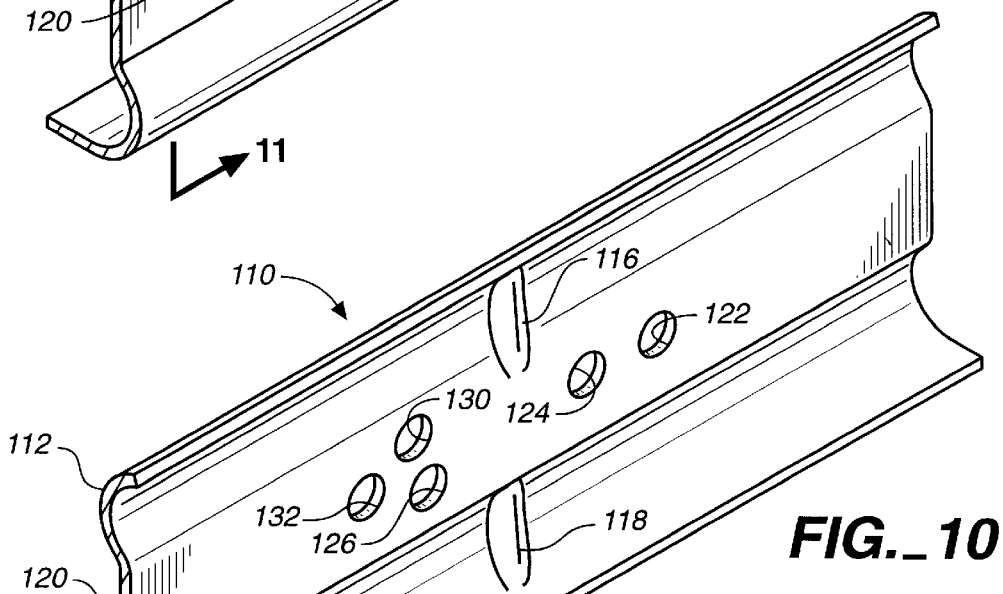
FIG._10
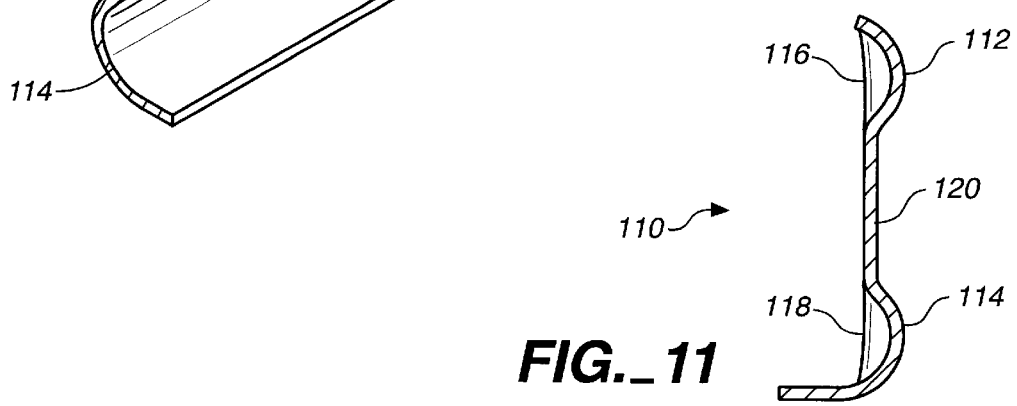
FIG._11

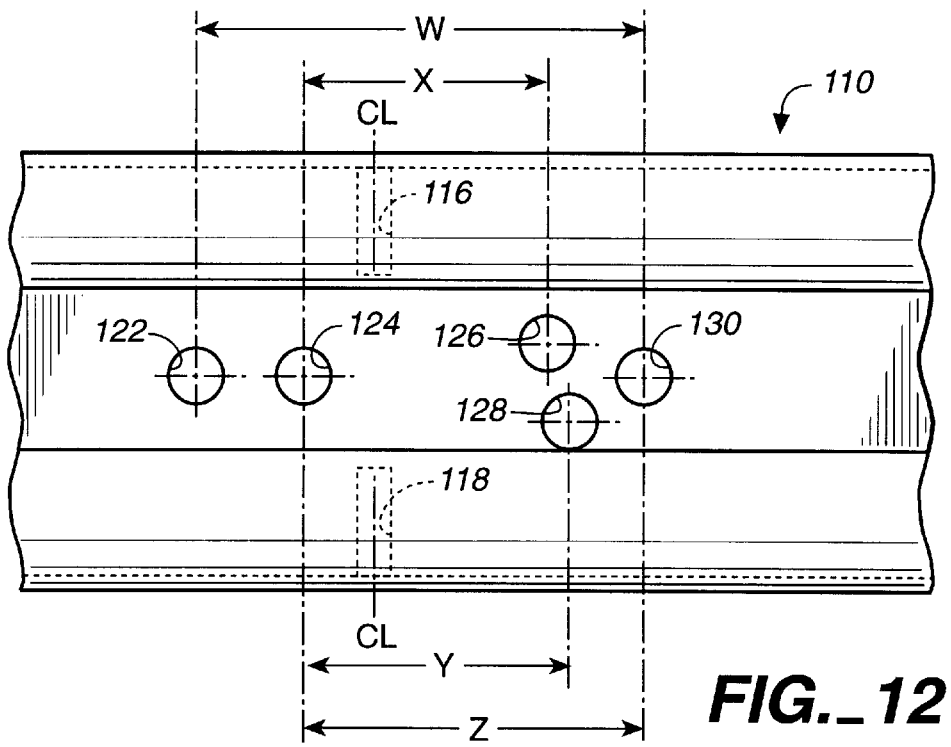
FIG._12
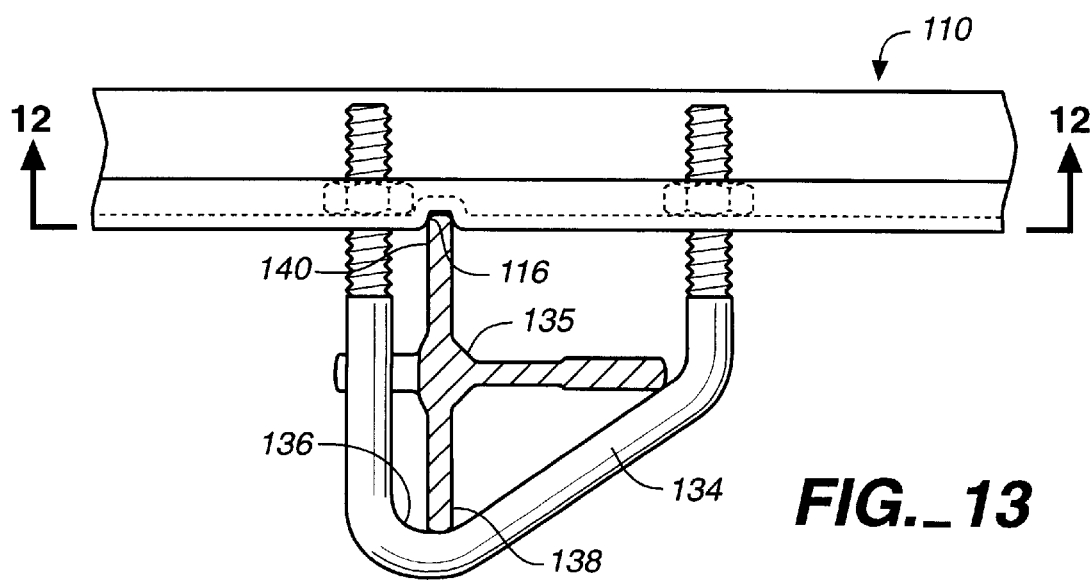
FIG._13

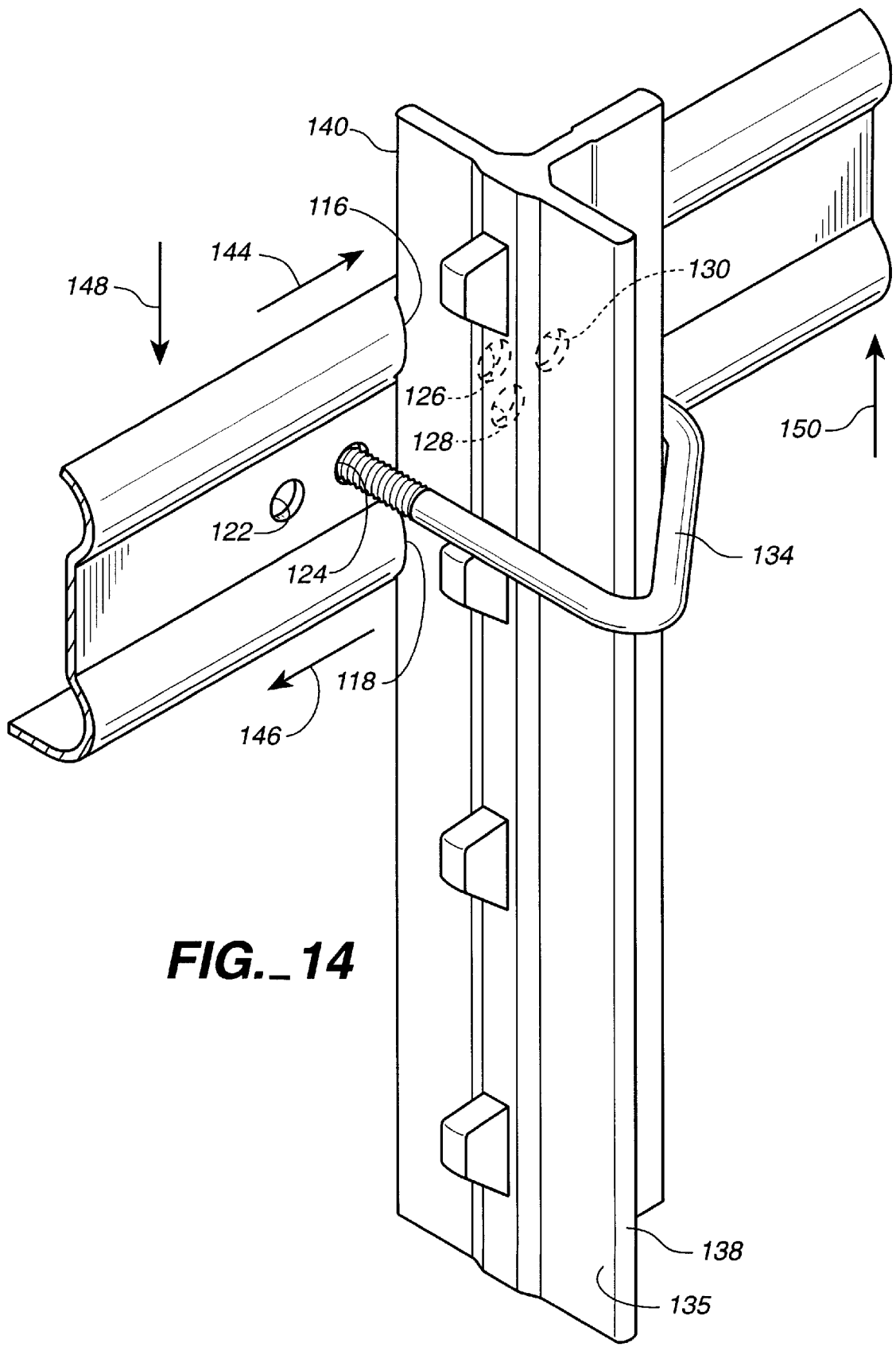
FIG._14

STAKE CROSS ARM FOR ORCHARDS AND GRAPEVINES

TECHNICAL FIELD

The present invention relates to stake assemblies used to support trellis and fruiting wires of the type that support grapevines and orchard trees and, more particularly, to an improved cross arm design for a support stake.

BACKGROUND ART

Our U.S. Pat. No. 5,501,035, entitled "Trellis Wire Support Assembly," includes a background discussion of vertical trellis system design, including basic trellis systems and design consideration therefor. This background discussion is incorporated herein. Common to many types of vertical trellis systems are stakes that have a basic T-formation or multiple T-formation, with one or more cross arms secured to an upright stake. Trellis and fruiting wires are strung between the cross arms of spaced apart stakes to create the necessary support structure for grapevines and orchard trees. While the present invention has utility for supporting grapevines and orchard trees, the discussion herein will be limited to grapevines because that is the context in which the present invention was developed.

Grapevine foliage grows either up past the trellis wires or down past the trellis wires, depending on the type of trellis system, which is dictated by the type of grape. With a Geneva Double Curtain system, grapevines grow down over trellis wires, whereas with a straight or lyre Canopy system, grapevines grow up past trellis wires. With both types of trellising systems, as well as with other systems, it is necessary for mechanical harvesting and pruning equipment to maneuver between trellis wires, which requires that the trellis wires be properly set up at a relatively constant height above the ground, allowing machinery to move relatively quickly down a trellis row and ccurately perform its functions. This requires the cross arms that support the wires to maintain their normal orientation to the stakes, typically 90°.

A common T-shaped grapevine stake is shown in FIG. 1. Stake 10 is driven into ground 12 and supports a cross arm 14 at approximately a 90° angle to stake 10. Trellis wires (not shown) are supported at the outer reaches of cross arm 14 and would extend into and out of the figure, supported by additional stakes. A grapevine 16 grows up and around stake 10 and the trellis wires. When the grapevines are fruiting, grape bunches hang down below the cross arm and trellis wires and mechanical harvest equipment moves longitudinally between adjacent trellis rows to shake and knock grapes from the vines. Grapevine pruning equipment moves along a trellis row in a similar manner to cut prune shoots from the vines during the grapevines dormant season.

FIG. 1 shows schematically part of a mechanical pruner 20 that has shears 22, 24 that move below and above cross arm 14 and prune the grapevine during its dormant season. Both pruning and harvesting machinery need to move at a fixed distance from the cross arms of each stake in order to properly perform their functions. Yet, the weight of the grapes, as well as other forces, place great strain on the connection of the cross arms to the stakes and, as a result, this connection needs to be extremely secure in order to resist these forces and thereby maintain the angle between the cross arm and the stake so that machinery with pre-positioned components can maneuver between trellises.

When the weight of the grapes causes the cross arms to sag, pivot or tilt, workers have to manually adjust and resecure the cross arms at proper 90° angles. This is both time consuming and adds significant expense to the process.

Our company, Vineyard Industries, Inc. of Windsor, Calif., USA, manufactures and sells a dimpled cross arm that is shown in FIGS. 2–5, upon which the present invention is an improvement. Referring to FIG. 2, dimpled cross arm 30 includes an upper raised rib 32 and a lower raised rib 34, each of which extend along the length of cross arm 30. A series of five holes 36, 38, 40, 42, 44 are provided at approximately the midpoint of cross arm 30 for receiving the legs 46, 48 of an off-set U-bolt 50. Cross arm 30 is secured by U-bolt 50 to a stake 52 that is T-shaped in cross section. The series of holes are provided to accommodate different width U-bolts, each specifically designed for different width stakes. Cross arm 30 also has an upper series of dimples 68 and a lower series of dimples 70, which are discussed later.

Referring to FIG. 3, stake 52 includes an upright side edge 60 that butts against cross arm 30, between dimples 70 (and dimples 68), when the cross arm and stake are secured together. Stake 52 also includes a center trunk 62, around which wraps leg 46 of bolt 50, and an opposite upright side edge 64, which anchors the apex 66 of bolt 50. With this design, stake 52 is held at three points by U-bolt 50 and is securely held to cross arm 30 and oriented with trunk 62 generally parallel with the cross arm.

Upper dimples 68 and lower dimples 70 are aligned with and are equally spaced from each other in a manner creating a uniform set of vertical channels 71 between the dimples, which channels provide different options for positioning side edge 60. The particular upright channel that side edge 60 abuts against is dependent on the size of the stake, which dictates the size U-bolt required. The purpose of the dimples is to abut side edge 60 and prevent cross arm 30 from teetering due to the force of the weight of the grapes.

Referring to FIGS. 4 and 5, for any given cross arm 30, significant vertical forces, indicated by arrows 73, can be exerted on the outer reaches of the cross arms by the weight of the grapes. Forces 73 tend to cause cross arm 30 to tilt relative to stake 52 even though U-bolt 50 securely holds the cross arm to the stake. The purpose of dimples 68, 70 is to resist tilting of cross arm 30 by creating a raised obstruction to tilting of cross arm relative to the side edge 60 of stake 52. Since U-bolt 50 securely holds side edge 60 against cross arm 30, cross arm 30 can not tilt to a significant degree relative to side edge 60 because dimples 68, 70 butt against the side edge, thereby preventing further tilting movement. However, in field practice it has been discovered that the performance of the dimples can be improved. It is an object of the present invention to prevent tilting of the cross arm to any significant degree.

Our company has also manufactured and sold in the past a slotted cross arm, the design for one of which is shown in FIGS. 6–8. Referring to FIGS. 6 and 7, slotted cross arm 76 includes a curved upper section 78 with a forward bulge 80 and a backwardly turned edge 82. A transverse slot 84 is created in bulge 80 for receiving a side edge of a grape stake. Cross arm 76 also includes a lower forwardly turned flange 86 that has a notch 88 cut therein. Notch 88 is aligned with slot 84 and also receives the side edge of a grape stake.

Cross arm 76 also includes a pair of bolt holes 90, 92 and a longitudinal slot 94, for receiving the legs of a U-bolt. One leg of a U-bolt extends through either hole 90 or 92, depending on the width of the U-bolt, and the other leg extends through longitudinal slot 94. Each hole 90, 92, in combination with slot 94, can accommodate different size U-bolts due to the extra width afforded by longitudinal slot 94. This allows cross arm 76 to be mounted to grape stakes of different widths, each of which requires a particular width U-bolt.

As shown in FIG. 8, cross arm 76 is secured by U-bolt 100 to grape stake 96, which has an upright side edge 98 that fits within slot 84 and notch 88. U-bolt 100 has a first leg 102 and a second leg 104, which extend, respectively through hole 92 (not shown in FIG. 8) and slot 94. A short backing plate or strap 106 is provided across the back of hole 92 and slot 94, through which legs 102, 104 extend. Nuts 108 secure bolt 100 and backing plate 106 to cross arm 76 wherein all of the components are rigidly secured together. Slot 84 and notch 88 prevent side edge 98 of cross arm 76 from pivoting or tilting about stake 96 due to the close fit of the side edge within the slot and notch. While slot 84 and notch 88 work well to prevent pivoting of cross arm 76, the provision of slot 84 and notch 88 has been found to structurally weaken the cross arm in a manner that may result in bending or breakage of the cross arm.

The cross arm of the present invention improves upon this design by providing a cross arm connection to a grape stake that is rigid and durable and does not structurally weaken the cross arm.

DISCLOSURE OF INVENTION

Briefly described, the present invention comprises a cross arm that has upper and a lower raised strength ribs that define a channel and approximate the midpoint of the cross arm a pair of sharply defined aligned indentations, one indentation in the upper rib and one indentation in the lower rib. The upper and lower indentations receive the upright side edge of the stake and are sufficiently sharply defined to capture the side edge of the stake and maintain the angle between the cross arm and the stake when the cross arm is secured to the stake.

The capture of the side edge of the stake in the upper and lower indentations creates a moment on the cross aim to counteract vertical forces on the outer portions of the cross arm. The moment is sufficient to maintain the angle between the cross arm and the stake to such a degree that machinery can pass above or below the stake without contacting the cross arm. Preferably, the moment is sufficient to maintain the angle of the cross arm to such a degree that the distance between the ends of the cross arm and the ground in which the stake is driven does not change as a result of the weight of the fruit and thereby impair the ability of machinery to move efficiently past the cross arm.

According to an aspect of the invention, the indentations are created by indentations made in the raised ribs, which indentations do not penetrate through the raised ribs so as to create a hole that weakens the structural integrity of the cross arm. Prior art cross arms with slots for receiving the side edge of a stake are prone to bending and breakage.

According to another aspect of the invention, the cross arm is secured to the stake by means of a U-bolt with a pair of legs that extend through holes in the cross arm and are mechanically fastened to the cross arm. The cross arm is provided with a first hole that is longitudinally to one side of the indentations and at least a second and third hole that are on the opposite side of the indentations from the first hole. The second and third holes are spaced different distances from the first hole, so that the first and second holes can receive the legs of a U-bolt having a first width dimension, and the first and third holes can receive the legs of another U-bolt having a second, different dimension. This allows the cross arm to mount to different width stakes by means of U-bolts specifically sized to fit the stake.

According to another aspect of the invention, for off-set U-bolts, with one leg longer than the other, the first hole receives the long leg of each U-bolt. The long leg of each U-bolt partially defines an apex of the U-bolt in which a second side edge of the stake is received. This ensures a tight and snug fit of the U-bolt around the stake.

These and other features, objects, and advantages of the present invention will become apparent from the following description of the best mode for carrying out the invention, when read in conjunction with the accompanying drawings, and the claims, which are all incorporated herein as part of the disclosure of the invention.

BRIEF DESCRIPTION OF THE DRAWINGS

Throughout the several views, like reference numerals refer to like parts, wherein:

FIG. 1 is a front elevation view of part of a mechanical pruner and a T-stake with a cross arm and a grapevine entrained therearound;

FIG. 2 is a is a pictorial view of a prior art dimpled cross arm and its connection to a grape stake;

FIG. 3 is a sectional view of the connection of FIG. 2;

FIG. 4 is a front elevation view of a T-stake with the connection of FIG. 2, illustrating tilting of the cross arm due to the weight of grapes;

FIG. 5 is an enlarged schematic view of the connection of FIG. 2 showing tilting of the cross arm;

FIG. 6 is a back side view of a portion of a prior art slotted cross arm;

FIG. 7 is a side elevation view of the slotted cross arm of FIG. 6;

FIG. 8 is a pictorial view of the slotted cross arm of FIG. 6 mounted to a grape stake with a backing plate added to the connection of the U-bolt;

FIG. 9 is a pictorial view of the central portion of the front of the cross arm of the present invention;

FIG. 10 is a pictorial view of the central portion of the back of the cross arm of FIG. 9;

FIG. 11 is a side elevation view of the cross arm of FIG. 9;

FIG. 12 is a front view of the central portion of the cross arm of FIG. 9 illustrating the spacing between corresponding holes;

FIG. 13 is a top view of the central portion of the cross arm and the side edge of a stake joined thereto;

FIG. 14 is a pictorial view of the connection of the cross arm of FIG. 9 to an upright stake.

BEST MODE OF CARRYING OUT THE INVENTION

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

Referring to FIG. 9, the cross arm 110 of the present invention is an elongated piece of roll formed heavy gauge metal of the type suitable for outdoor use. Cross arm 110 includes a raised, curved upper rib 112 and a raised, curved lower rib 114, each extending along the length of the cross arm, and which together define between them a channel 120. Upper rib 112 includes a transverse, sharply defined indention 116 and lower rib 114 includes a similar aligned transverse indentation 118. Within channel 120 and at approximately the midpoint of cross arm 110 are a series of five holes 122, 124, 126, 128, 130, which provide openings for the legs of different size U-bolts.

FIG. 10 shows the back side of cross arm 110 and FIG. 11 shows a sectional view. Indentations 116, 118 are stamped or punched into raised ribs 112, 114 in a manner that the indentations do not create a hole or opening in the rib and do not otherwise structurally weaken the cross arm. This is an important advantage of the cross arm of the present invention over the slotted cross arm discussed in the Background section. A slotted cross arm has a structural weakness in the area around its slot and, in practice, these areas have required a backing plate for added structural rigidity and still have tended to bend and even break. The indentations of the present cross arm retain structural integrity while still providing a sharply defined interengagement between the cross arm and the side edge of the stake.

Referring to FIG. 12, the layout of the holes 122–130 is specifically designed to provide for mounting of cross arm 110 to different size stakes with the side edge of each stake resting in indentations 116, 118. Indentations 116, 118 are made in cross arm 110 at the centerline CL of the cross arm, and holes 122, 124 are located to one side of center line CL while holes 126, 128, 130 are located to the other side.

The distance W between holes 122 and 130 is 2.23 inches, the distance X between hole 124 and hole 126 is 1.22 inches, the distance Y between hole 124 and hole 128 is 1.34 inches and the distance Z between hole 124 and hole 130 is 1.69 inches. Dimensions W, X, Y, Z correspond to the standard width U-bolts provided by applicants' company, as well as other companies, for securing cross arms to grape stakes.

Hole 124 is the primary hole for receiving the longer leg of off-set U-bolts, while holes 126, 128, 130 receive the shorter U-bolt legs. Depending on the width of the particular U-bolt needed to fit a grape stake, the shorter leg of the U-bolt will fit into either hole 126, 128, 130. For example, a 1.69 inch U-bolt will have its longer leg extend through hole 124 and its shorter leg extend through hole 130. Hole 122 corresponds with hole 130 and is used for extra wide U-bolts that mount to round stakes in a manner not requiring a side edge of the stake to engage indentations 116, 118.

Referring to FIG. 13, T-shaped stake 135 is secured to cross arm 110 by an off-set U-bolt 134. Regardless of the width of U-bolt 134, the apex 136 of the U-bolt aligns with indentations 116, 118, which allows the apex to wrap around the stake's side edge 138, opposite side edge 140, for T-shaped grape stakes.

As shown in FIG. 13, side edge 140 wedges into indentation 118 (as well as into indentation 116) and is securely held therein by U-bolt 134. The shape of indentation 118 (as well as indentation 116) closely conforms to the shape of side edge 140, which ensures that the two fit snugly together and as a result there is no tilting movement of the cross arm relative to the stake. In the claims, the term "sharply defined" is used to represent this concept.

More specifically, referring to FIG. 14, the sharply defined contours of indentations 116, 118 capture the side edge 140 of the stake and, in response to vertical forces 148, 150 at the ends of cross arm 110, create longitudinal counter forces, indicated by arrows 144, 146, that counter act vertical forces 148, 150 and keep cross arm 110 oriented at the proper angle to stake 135. Vertical forces 148, 150, of course, are caused by the weight of grapes hanging from vines supported by the cross arm.

The capture of the side edge of the stake in the upper and lower indentations creates a moment on the cross arm, which is associated with counter forces 144, 146, which counteract vertical forces on the outer portions of the cross arm. The moment is sufficient to maintain the angle between the cross arm and the stake to such a degree that machinery can pass above or below the stake without contacting the cross arm. Moreover, the moment is sufficient to maintain the angle between the cross arm and the stake to such a degree that the distance between the ends of the cross arm and the ground in which the stake is driven does not change as a result of the weight of the fruit and thereby impair the ability of machinery to move efficiently past the cross arm.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto when read and interpreted according to accepted legal principles such as the doctrine of equivalents and reversal of parts.

What is claimed is:

1. A cross arm for a stake of the type having at least one upright side edge, the cross arm having sufficient span to support wires at each end in spaced relationship for supporting orchards or grapevines, the improvement comprising the cross arm including an upper and a lower raised strength rib that are arcuate in transverse cross section and that between them define a channel, and approximate the midpoint of the cross arm a pair of sharply defined indentations, one indentation in the upper rib and one indentation in the lower rib, the upper and lower indentations being aligned with one another for receiving the upright side edge of the stake, the upper and lower indentations being sufficiently sharply defined to capture the side edge of the stake and maintain the angle between the cross arm and the stake when the cross arm is secured to the stake;

the indentations are created by indentations made in the raised ribs, which indentations do not penetrate through the raised ribs so as to create a hole that weakens the structural integrity of the cross arm;

wherein the indentations are sufficiently long to capture the side edge of the stake in a manner creating a moment on the cross arm to counteract vertical forces on the outer portions of the cross arm;

a U-bolt for securing the cross arm to the stake the U-bolt including a pair of legs that extend through holes in the cross arm and are mechanically fastened to the cross arm.

2. The cross arm of claim 1 wherein, the moment is sufficient to maintain the angle between the cross arm and the stake to such a degree that machinery can pass above or below the stake without contacting the cross arm.

3. The cross arm of claim 2 wherein, the moment is sufficient to maintain the angle between the cross arm and the stake to such a degree that the distance between the ends of the cross arm and the ground in which the stake is driven does not change as a result of the weight of the fruit and thereby impair the ability of machinery to move efficiently past the cross arm.

4. The cross arm of claim 1 wherein, the indentations have sufficient depth to be flush with the channel defined between the raised ribs.

5. The cross arm of claim 1 wherein, the cross arm is provided with a first hole that is to one side of the indentations and at least a second and third hole that are to the opposite side of the indentations from the first hole, the second and third holes being spaced different distances from the first hole, so that the first and second holes can receive the legs of a U-bolt having a first width dimension, and the first and third holes can receive the legs of another U-bolt having a second, different dimension.

6. The cross arm of claim 5 wherein, a fourth hole is provided opposite the indentations from the first hole, the fourth hole being spaced from the first hole a distance that is different from the spacing between the second and third holes and the first hole.

7. The cross arm of claim 5 wherein, the U-bolts are off-set with one leg longer than the other, and wherein the first hole can receive the long leg of each U-bolt.

8. The cross arm of claim 7 wherein, the long leg of each U-bolt partially defines an apex of the U-bolt in which a second side edge of the stake can be received.

9. The cross arm of claim 1 wherein, the indentations are vertically aligned, short linear segments adapted to partially capture a straight side edge of the stake.

10. A cross arm assembly for a stake of the type having at least one upright side edge, the cross arm having sufficient span to support wires at each end in spaced relationship for supporting orchards or grapevines, the improvement comprising the cross arm including an upper and a lower raised strength rib that are arcuate in transverse cross section and that between them define a channel, and approximate the midpoint of the cross arm a pair of sharply defined indentations, one indentation in the upper rib and one indentation in the lower rib, the upper and lower indentations being aligned with one another for receiving the upright side edge of the stake, the upper and lower indentations being sufficiently sharply defined to capture the side edge of the stake and maintain the angle between the cross arm and the stake when the cross arm is secured to the stake;

the indentations are created by indentations made in the raised ribs, which indentations do not penetrate through the raised ribs so as to create a hole that weakens the structural integrity of the cross arm;

wherein the indentations are sufficiently long to capture the side edge of the stake in a manner creating a moment on the cross arm to counteract vertical forces on the outer portions of the cross arm;

and a U-bolt that is offset having a longer leg and a shorter leg, with the longer leg adapted to be positioned proximate the upright side edge of the stake.

* * * * *